(12) United States Patent
Kim et al.

(10) Patent No.: US 8,831,827 B2
(45) Date of Patent: Sep. 9, 2014

(54) METHOD AND APPARATUS FOR PROJECTING NAVIGATION INFORMATION ONTO FRONT OF VEHICLE

(71) Applicant: Korea Institute of Science and Technology, Seoul (KR)

(72) Inventors: Ig Jae Kim, Goyang-si (KR); Jaewon Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/833,557

(22) Filed: Mar. 15, 2013

(65) Prior Publication Data

US 2013/0261891 A1 Oct. 3, 2013

(30) Foreign Application Priority Data

Mar. 27, 2012 (KR) ........................ 10-2012-0031214

(51) Int. Cl.
*G01C 21/36* (2006.01)
*G08G 1/09* (2006.01)

(52) U.S. Cl.
USPC ........... 701/36; 701/49; 701/454; 340/995.26

(58) Field of Classification Search
CPC .... C01C 21/365; G01C 21/365; G01C 21/36; G08G 1/09
USPC .............. 701/36, 49, 428, 533, 454; 345/419; 342/70; 340/995.26
See application file for complete search history.

(56) References Cited

U.S. PATENT DOCUMENTS

| 8,325,180 | B2 * | 12/2012 | Kim ............................. 345/419 |
| 2008/0186210 | A1 * | 8/2008 | Tseng ...................... 340/995.26 |
| 2009/0132162 | A1 * | 5/2009 | Kudoh et al. ................. 701/201 |
| 2009/0187335 | A1 * | 7/2009 | Muhlfelder et al. .......... 701/200 |
| 2010/0217515 | A1 * | 8/2010 | Arai et al. ..................... 701/201 |
| 2010/0292886 | A1 * | 11/2010 | Szczerba et al. ................ 701/29 |
| 2011/0054783 | A1 * | 3/2011 | Kishikawa et al. ........... 701/209 |
| 2011/0137508 | A1 * | 6/2011 | Garcia Manchado .......... 701/29 |

FOREIGN PATENT DOCUMENTS

| JP | 1993-018951 | 3/1993 |
| KR | 10-1999-0061946 A | 7/1999 |
| KR | 10-2010-0002027 | 1/2010 |

OTHER PUBLICATIONS

Korean Office Action issued Jul. 4, 2013 in counterpart Korean Patent Application No. 10-2012-0031214. (9 pages including English translation).
Korean Notice of Allowance issued Jan. 15, 2014 in counterpart Korean Patent Application No. 10-2012-0031214 (7 pages including partial English translation).

* cited by examiner

*Primary Examiner* — Tan Q Nguyen
(74) *Attorney, Agent, or Firm* — NSIP Law

(57) ABSTRACT

Provided are a method and apparatus for projecting driving information in front of a vehicle with respect to a destination. The method for projecting driving information in front of the vehicle with respect to the destination may include obtaining driving information and controlling a driving information projecting apparatus on the basis of the obtained driving information. The driving information projecting apparatus may include a driving information display unit displaying the obtained driving information and a lighting unit used as a light source 100 for the driving information display unit.

11 Claims, 5 Drawing Sheets

METHOD AND APPARATUS FOR PROJECTING NAVIGATION INFORMATION ONTO FRONT OF VEHICLE

CROSS-REFERENCE TO RELATED PATENT APPLICATION

This application claims the benefit of Korean Patent Application No. 10-2012-0031214, filed on Mar. 27, 2012, in the Korean Intellectual Property Office, the disclosure of which is incorporated herein in its entirety by reference.

BACKGROUND OF THE INVENTION

1. Field of the Invention

The present invention relates to a method and apparatus for projecting driving information in front of a vehicle and more particularly, to a method and apparatus for projecting the driving information of a vehicle in front of the vehicle through a driving information projecting apparatus.

2. Description of the Related Art

As the number of vehicles in use has increased and the use of GPS information through a satellite has also increased, using a navigation system while driving is generally common. Navigation systems have been developed to perform various functions such matching of a moving vehicle onto a map with respect to GPS information, route searching, route guiding, and providing of traffic information.

While the use of the navigation system has generally saved drivers from having to retrieve/refer to a physical map or searching for a route taking a short time, a problem of traffic accident occurrence has emerged due to drivers' attention being drawn to the display unit of a navigation system (for example, a screen) that provides driving information.

In other words, since information required for driving, such as driving directions from a point of departure to the destination, is displayed on the display units, such as liquid crystal displays, of the vehicle navigation apparatuses, there is a problem that safe driving may be hindered due to drivers who frequently check on the display units while driving.

SUMMARY OF THE INVENTION

The present invention provides a method and apparatus for projecting driving information in front of a vehicle.

According to an aspect of the present invention, there is provided a method of projecting driving information to the destination onto the front of a vehicle. The method of projecting driving information to the destination onto the front of a vehicle may include obtaining the driving information, and controlling a driving information projecting apparatus on the basis of the obtained driving information, and wherein the driving information projecting apparatus may include a driving information display unit displaying driving information and a lighting unit used as a light source for the driving information display unit.

According to another aspect of the present invention, there is provided an apparatus for projecting driving information from a point of departure to the destination onto the front of a vehicle. The apparatus for projecting driving information from a point of departure to the destination onto the front of a vehicle may include a driving information obtaining unit obtaining the driving information, and a driving information display unit displaying the obtained driving information. In addition, the apparatus for projecting driving information from a point of departure to the destination onto the front of a vehicle may include a lighting unit providing a light source for the driving information display unit, and a control unit controlling the driving information display unit on the basis of the obtained driving information.

According to another aspect of the present invention, there is provided a computer readable recording medium on which a program to execute the methods described above on a computer is recorded.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
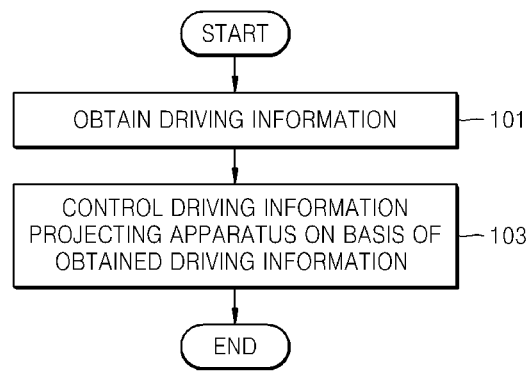
FIG. 1 is a flow chart representing a method of projecting driving information in front of a vehicle according to an embodiment of the present invention.

Advantages and features of the present invention, and implementation methods thereof will be clarified through the following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout the specification.

Detailed descriptions related to well-known functions or configurations will be ruled out so as not to unnecessarily obscure subject matters of the present invention. The terms described below are those defined by considering the functions in embodiments of the present invention and may vary depending on the intention or of a user or an operator or practice. Therefore, the definitions will be made on the basis of the contents throughout the specification.

Expressions such as "at least one of," when preceding a list of elements, modify the entire list of elements and do not modify the individual elements of the list.

The present invention is intended to overcome a problem with the conventional technology related to drivers who are distracted by navigation systems while driving and aims at providing driving information in a safe and efficient manner to drivers. This is accomplished by projecting driving information to be used for travelling from a point of departure to a destination (i.e. driving directions) in front of the vehicle.

In other words, the present invention projects, in front of the vehicle, guide information that must be followed while travelling in a vehicle to the destination, by using a driving information projecting apparatus attached to the front portion of the vehicle. The use of the driving information projecting apparatus is to prevent the drivers from becoming distracted whenever they have to check driving information on the screen of a navigation apparatus. Thus, the present invention ensures safe driving and provides driving information in a convenient manner.

Objects of the present invention are not limited to those mentioned above, however, other objects not mentioned may be clearly understood from the descriptions below by those skilled in the art to which the present invention pertains.

Embodiments of the present invention will be described in detail below with reference to the accompanying drawings.

FIG. 1 is a flow chart representing a method of projecting driving information in front of a vehicle according to an embodiment of the present invention.

The method of projecting the driving information in front of the vehicle may include a step 101 for obtaining driving information and a step 103 for controlling a driving information projecting apparatus on the basis of the obtained driving information. The driving information projecting apparatus may include a driving information display unit for displaying driving information and a lighting unit used as a light source for the driving information display unit. The driving information may include arrows for indicating directions and distance information.

The step 101 for obtaining driving information may include obtaining route information from a point of departure to the destination from a navigation apparatus. In addition, the step 101 for obtaining driving information may include obtaining a map database and GPS values and creating route information from the point of departure to the destination by using the obtained map database and GPS values.

The step 103 for controlling of the driving information projecting apparatus may further include changing information displayed on the driving information display unit on the basis of the obtained driving information. For example, the step 103 for controlling of the driving information projecting apparatus of the present application may change information to be displayed on the driving information display unit (for example, driving information including distance and direction information, such as information directing a driver to turn right after travelling for 100 m) according to the driving information obtained with respect to a moving vehicle.

The lighting unit 203 according to the embodiment of the present invention may include a headlight, a fog light, etc.

Figure 2:
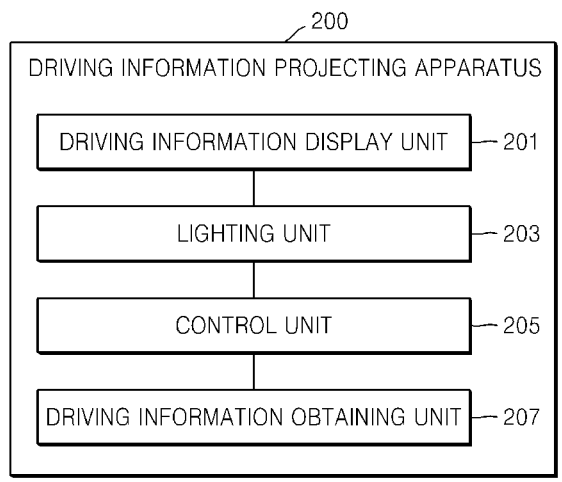
FIG. 2 illustrates an example of a driving information projecting apparatus according to an embodiment of the present invention.

FIG. 2 illustrates an example of a driving information projecting apparatus according to an embodiment of the present invention.

As an embodiment of the present invention, an apparatus for projecting driving information in front of a vehicle is provided, wherein the driving information includes route information from a point of departure to the destination. The driving information projecting apparatus 200 may include a driving information display unit 201, a lighting unit 203, a control unit 205, and a driving information obtaining unit 207.

Figure 5:
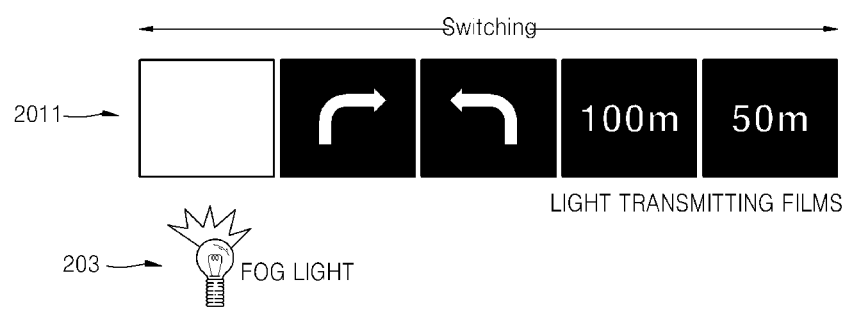
FIG. 5 illustrates an example of a driving information projecting apparatus that uses a light transmitting film according to an embodiment of the present invention.
Figure 6:
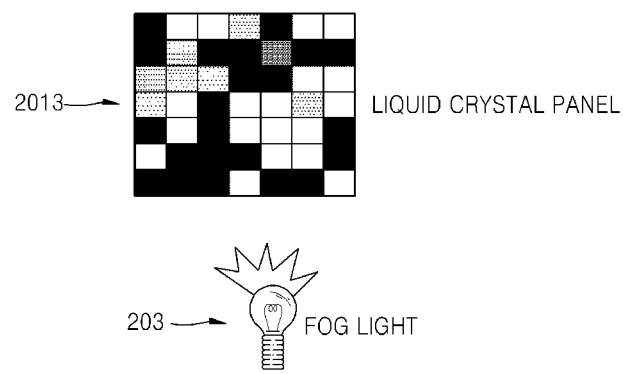
FIG. 6 illustrates an example of a driving information projecting apparatus that uses a liquid crystal panel according to an embodiment of the present invention.

The driving information display unit 201 may display the driving information obtained by the driving information obtaining unit 207. As illustrated in FIGS. 5 and 6 to be described below, the driving information display unit 201 may be implemented in a type of light transmitting film 2011 or a type of liquid crystal panel 2013.

The lighting unit 203 may provide a light source for the driving information display unit 201. The lighting unit 203 according to an embodiment of the present invention may include a headlight, a fog light, etc.

The control unit 205 may control the driving information display unit 201 on the basis of the driving information obtained by the driving information obtaining unit 207.

The driving information obtaining unit 207 may include driving information related to the destination of a vehicle.

Figure 3:
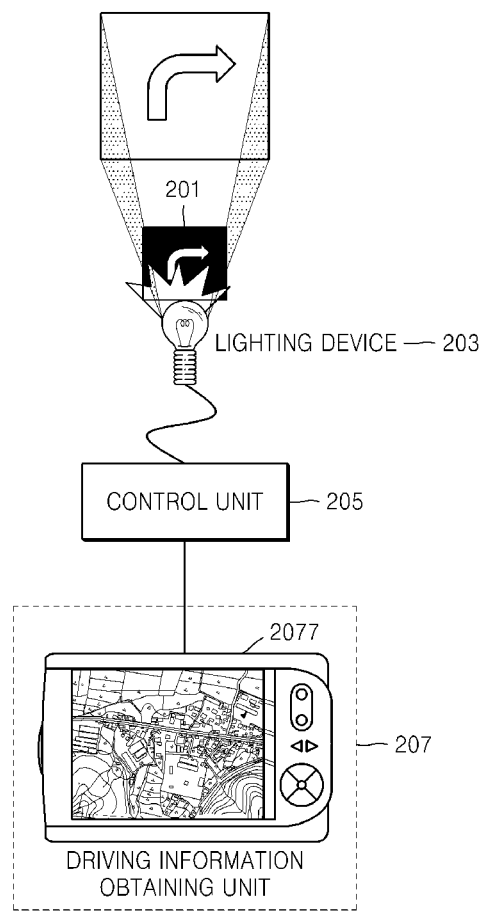
FIG. 3 is an example of a driving information projecting apparatus that obtains driving information from a navigation apparatus and provides the obtained driving information to drivers according to an embodiment of the present invention.

FIG. 3 is an example of a driving information projecting apparatus that obtains driving information from a navigation apparatus 2077 and provides the obtained driving information to drivers according to an embodiment of the present invention.

According to an embodiment of the present invention, the driving information obtaining unit 207 may include a navigation apparatus 2077. In addition, the driving information obtaining unit 207 may obtain driving information from the navigation apparatus 2077 that is arranged outside the driving information obtaining unit 207 and coupled to the driving information obtaining unit 207. The navigation apparatus 2077 that is arranged outside the driving information obtaining unit 207 and coupled to the driving information obtaining unit 207 may include portable instruments such as smart phones and personal digital assistants that provide a navigation function and may be coupled to the driving information obtaining unit 207 in a wired manner or wirelessly.

Drivers may utilize the navigation apparatus 2077 to request and obtain driving information indicative of directions to the destination and be provided the obtained driving information through the driving information display unit 201, lighting unit 203, and control unit 205.

Figure 4:
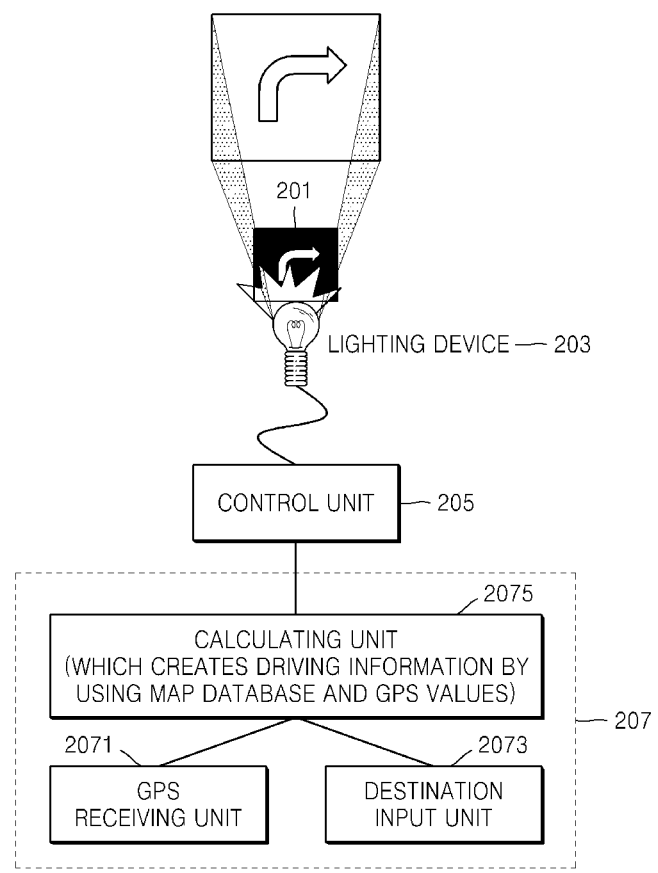
FIG. 4 is an example of a driving information projecting apparatus that creates driving information by using a map database and a GPS value and provides the created driving information to drivers according to an embodiment of the present invention.

FIG. 4 is an example of a driving information projecting apparatus that generates driving information by using a map database and a GPS value and provides the generated driving information to drivers according to an embodiment of the present invention According to an embodiment of the present invention, the driving information obtaining unit 207 includes a GPS receiving unit 2071, a destination input unit 2073, and a calculation unit 2075. The GPS receiving unit 2071 obtains the current location of a moving vehicle as coordinate information using GPS.

In addition, a driver inputs the desired destination through the destination input unit 2073. The destination may be represented in the form of GPS coordinate values.

The calculating unit 2075 may use a map database, the current GPS coordinate information of a vehicle, and the GPS coordinate value of the destination to create driving information. Drivers may obtain driving information to the destination created in this way and be provided the obtained driving information through the driving information display unit 201, lighting unit 203, and control unit 205.

FIG. 5 illustrates an example of a driving information projecting apparatus that uses a light transmitting film 2011 according to an embodiment of the present invention.

According to an embodiment of the present invention, the driving information display unit 201 of the driving information projecting apparatus 200 may include a type of a light transmitting film 2011. The driving information display unit 201 may be provided a light source from the lighting unit 203 to display driving information in front of a vehicle and may provide the driving information to a driver.

The control unit 205 may control the light transmitting films 2011 on the basis of driving information so that they are mutually switched.

The lighting unit 203 according to an embodiment of the present invention may include a headlight, a fog light, etc.

FIG. 6 illustrates an example of a driving information projecting apparatus that uses a liquid crystal panel 2013 according to an embodiment of the present invention.

According to an embodiment of the present invention, the driving information display unit 201 of the driving information projecting apparatus 200 may include a type of a liquid crystal panel 2013. The control unit 205 may control the liquid crystal panel 2013 to display driving information on the liquid crystal panel 2013. The driving information display unit 201 that includes the type of a liquid crystal panel 2013 may be provided a light source from the lighting unit 203 and selectively transmit the light source to display driving information in front of a vehicle to provide various forms of driving information to drivers.

Selectively transmitting the light source may include, for example, transmitting light directly to marks related to direction or distance information (for example, arrows, numerals, symbols, etc.) or transmitting light to only parts except for the marks related to direction or distance information to display driving information including direction or distance information such as turning right, turning left, 100 m, 50 m, etc. in front of the vehicle.

Figure 7:
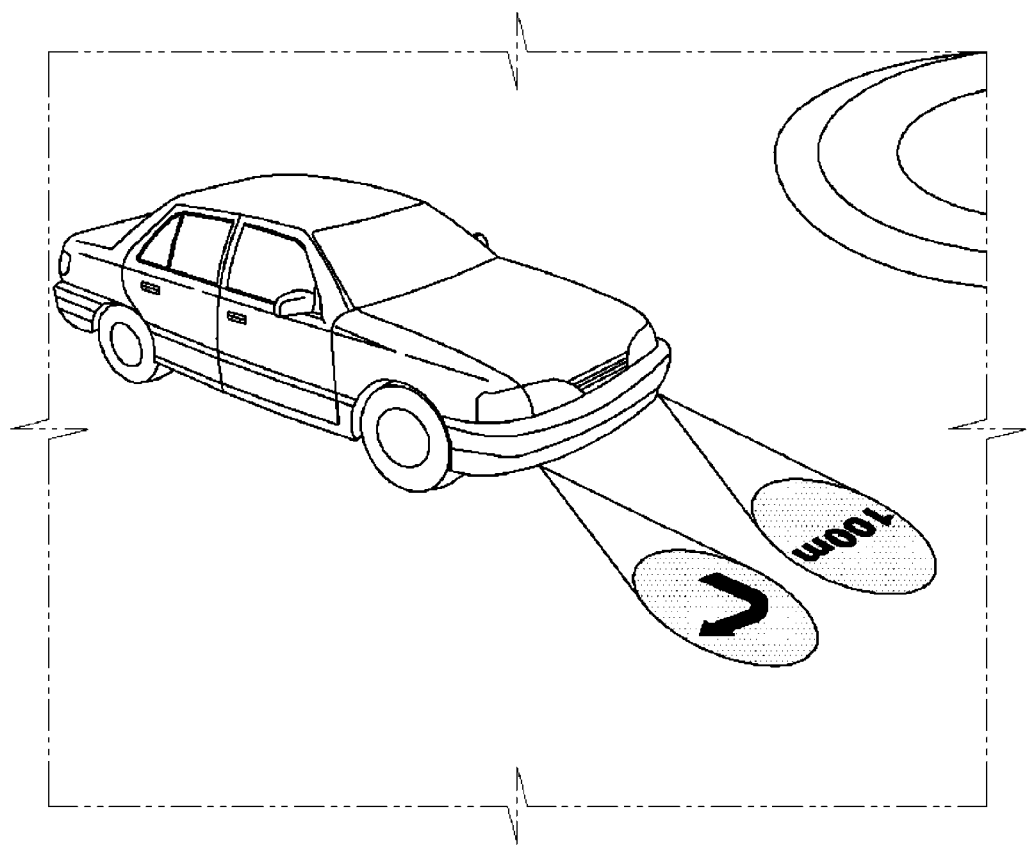
FIG. 7 illustrates projecting driving information in front of a vehicle according to an embodiment of the present invention.

FIG. 7 illustrates projecting driving information in front of a vehicle according to an embodiment of the present invention.

According to an embodiment of the present invention, the driving information of a vehicle may be projected onto the road in front of a moving vehicle. As an example, according to an embodiment of the present invention, the fog light of a vehicle may be utilized as the lighting unit 203 to project driving information (for example, direction and distance information) indicative of directions to a destination onto the road in front of the vehicle.

In addition, according to another embodiment of the present invention, each of a plurality of lighting units 203 may be implemented to project different driving information (for example, direction or distance information).

The present invention may allow drivers to safely drive because the information required for driving (including information on distance and direction) is projected in front of a vehicle instead of being displayed on a separate screen such as the display unit of a vehicle navigation apparatus that drivers might otherwise direct their eyes toward.

The embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), and a storage media such as carrier waves (e.g., transmission through the Internet).

While this invention has been particularly shown and described with reference to preferred embodiments thereof, it will be understood by those skilled in the art that various changes in form and details may be made therein without departing from the spirit and scope of the invention as defined by the appended claims.

The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of projecting driving information in front of a vehicle with respect to a destination, the method comprising:
   obtaining the driving information; and
   controlling a driving information projecting apparatus on the basis of the obtained driving information so as to project the driving information in front of the vehicle, wherein:
   the driving information projecting apparatus comprises a driving information display unit displaying the obtained driving information and a lighting unit used as a light source for the driving information display unit,
   the method is performed by using a computer, and
   the lighting unit comprises at least one of a headlight and a fog light.

2. The method of claim 1, wherein the obtaining of the driving information comprises obtaining, from a navigation apparatus, route information from a point of departure to the destination.

3. The method of claim 1, wherein the obtaining of the driving information comprises:
   obtaining a map database and GPS values; and
   creating route information from a point of departure to the destination by using the obtained map database and GPS values.

4. The method of claim 1, wherein the driving information display unit comprises a light transmitting film or a liquid crystal panel.

5. The method of claim 4, wherein the controlling of the driving information projecting apparatus further comprises changing information displayed on the driving information display unit on the basis of the obtained driving information.

6. A non-transitory computer readable storage medium having stored thereon a program comprising instructions, which when executed by a computer, perform the method of claim 1.

7. An apparatus for projecting driving information in front of a vehicle, the driving information starting from a point of departure to a destination, the apparatus comprising:
   a driving information obtaining unit configured to obtain the driving information;
   a driving information display unit configured to display the obtained driving information in front of the vehicle;
   a lighting unit configured to provide a light source for the driving information display unit; and
   a control unit configured to control the driving information display unit on the basis of the obtained driving information, wherein
   the lighting unit comprises at least one of a headlight and a fog light.

8. The apparatus of claim 7, wherein the driving information obtaining unit obtains, from a navigation apparatus, route information from the point of departure to the destination.

9. The apparatus of claim 7, wherein the driving information obtaining unit obtains a map database and GPS values and uses the obtained map database and GPS values to create route information from the point of departure to the destination.

10. The apparatus of claim 7, wherein the driving information display unit comprises a light transmitting film or a liquid crystal panel.

11. The apparatus of claim 7, wherein the control unit changes information displayed on the driving information display unit on the basis of the obtained driving information.

\* \* \* \* \*